(12) United States Patent
Kuila et al.

(10) Patent No.: US 7,995,596 B2
(45) Date of Patent: Aug. 9, 2011

(54) SYSTEM AND METHOD FOR OFFLOADING PACKET PROTOCOL ENCAPSULATION FROM SOFTWARE

(75) Inventors: Kaushik Kuila, San Jose, CA (US); David T. Hass, Santa Clara, CA (US); Ahmed Shahid, San Jose, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 78 days.

(21) Appl. No.: 12/120,082

(22) Filed: May 13, 2008

(65) Prior Publication Data
US 2009/0285235 A1 Nov. 19, 2009

(51) Int. Cl.
*H04L 12/28* (2006.01)
*H04L 12/56* (2006.01)
(52) U.S. Cl. ....................... 370/412; 370/469
(58) Field of Classification Search .......... 370/229, 370/230, 235, 389, 412, 465
See application file for complete search history.

(56) References Cited

U.S. PATENT DOCUMENTS

| | | | | |
|---|---|---|---|---|
| 5,396,490 | A | * | 3/1995 | White et al. ............... 370/474 |
| 5,950,231 | A | * | 9/1999 | Nichol .................... 711/170 |
| 6,701,447 | B1 | * | 3/2004 | Bass et al. ................ 713/502 |
| 6,963,921 | B1 | * | 11/2005 | Yang et al. ............... 709/230 |
| 6,990,535 | B1 | | 1/2006 | Yang et al. ................ 710/3 |
| 7,818,389 | B1 | * | 10/2010 | Chiang et al. ............. 709/212 |
| 2004/0085962 | A1 | | 5/2004 | Sugai et al. .............. 370/392 |
| 2004/0228339 | A1 | * | 11/2004 | Gallo et al. .............. 370/379 |
| 2005/0055504 | A1 | | 3/2005 | Hass et al. ................ 711/122 |
| 2006/0080479 | A1 | * | 4/2006 | Anjo et al. ............... 710/22 |
| 2006/0271721 | A1 | | 11/2006 | Beukema et al. .......... 710/307 |

FOREIGN PATENT DOCUMENTS
WO WO 2009/139805 1/2010

OTHER PUBLICATIONS
International Search Report and Written Opinion from PCT Application No. PCT/US09/01685 mailed on May 5, 2009.

* cited by examiner

*Primary Examiner* — Derrick W Ferris
*Assistant Examiner* — Maharishi Khirodhar
(74) *Attorney, Agent, or Firm* — Vista IP Law Group, LLP

(57) ABSTRACT

A method is provided for offloading packet protocol encapsulation from software. In operation, pointer information is received. Furthermore, packet protocol encapsulation is offloaded from software by assembling packets in hardware, using the pointer information.

23 Claims, 5 Drawing Sheets

SYSTEM AND METHOD FOR OFFLOADING PACKET PROTOCOL ENCAPSULATION FROM SOFTWARE

FIELD OF THE INVENTION

The present invention relates to networked computer systems, and more particularly to packet protocol encapsulation.

BACKGROUND

Some networking applications may require the addition, deletion, or replacement of bytes in a packet. Typically, processors running such applications copy parts of the incoming packet to memory and make the relevant modifications before transmitting the packet. This often consumes valuable memory and processing time.

There is thus a need for addressing these and/or other issues associated with the prior art.

SUMMARY

A method is provided for offloading packet protocol encapsulation from software. In operation, pointer information to various packet segments and protocol headers is received. Furthermore, packet protocol encapsulation is offloaded from software by assembling packets in hardware, using the pointer information.

DETAILED DESCRIPTION

Figure 1:
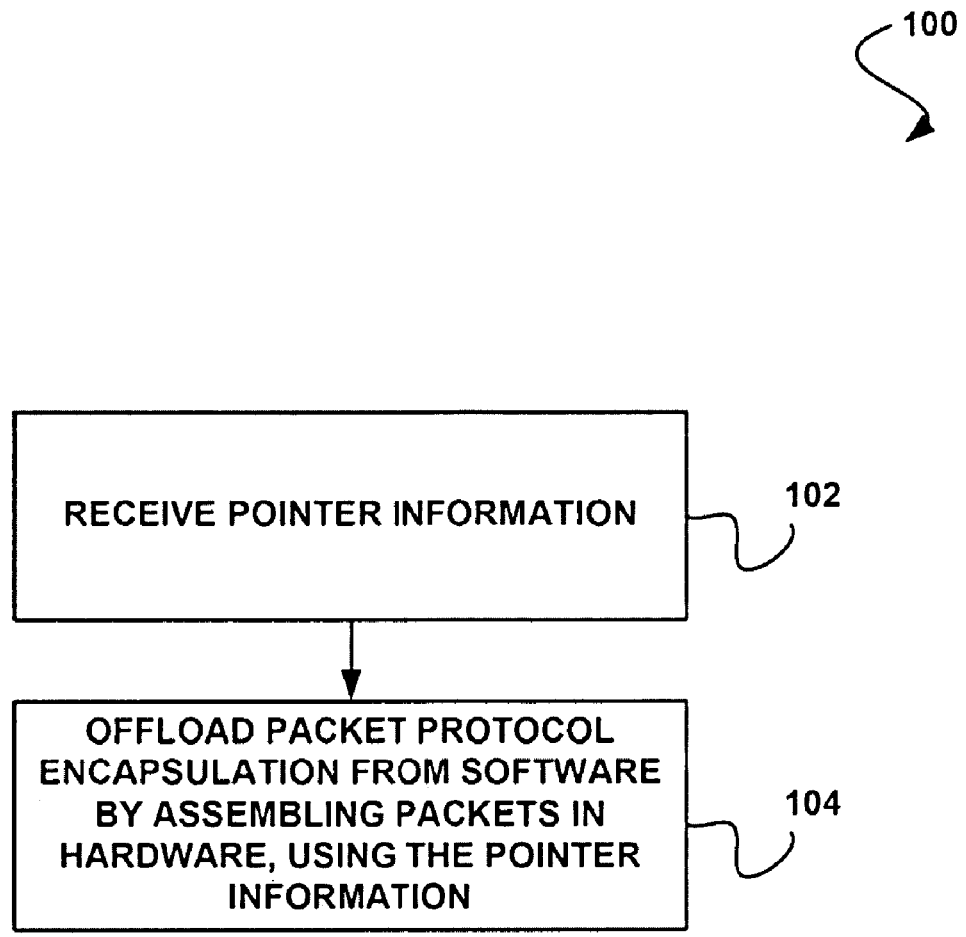
FIG. 1 shows a method for offloading packet protocol encapsulation from software, in accordance with one embodiment.

FIG. 1 shows a method 100 for offloading packet protocol encapsulation from software, in accordance with one embodiment. As shown, pointer information is received. See operation 102.

In the context of the present description, pointer information refers to any information associated with one or more pointers. For example, in various embodiments, the pointer information may include, but is not limited to, a plurality of pointers, a single pointer that points to a plurality of pointers, destination identifiers, and/or any other pointer information that meets the above definition.

Furthermore, a pointer refers to any data that refers to, or points to, a stored value or data. For example, in one embodiment, the pointer may include address information. As an option, the pointer information or the pointer may include length information associated with the data to which the pointer is pointing.

As shown further in FIG. 1, packet protocol encapsulation is offloaded from software by assembling packets in hardware, using the pointer information. See operation 104. In one embodiment, the pointer information may be used to look up packet protocol encapsulation information from memory. In another embodiment, the pointer information may be used to look up additional pointer information from memory.

In the context of the present description, packet protocol encapsulation refers to encapsulating network protocol information in a packet. For example, in various embodiments, the protocol information may include, but is not limited to, multi-protocol label switching (MPLS) headers, Internet protocol headers, security headers, virtual local-area network (VLAN) tags, and/or any other protocol information that meets the above definition.

Furthermore, software refers to any software or driver capable of packet protocol encapsulation. For example, in various embodiments, the software may include, but is not limited to, a Linux operating system driver, a Windows operating system drive, and/or any other software that meets the above definition. Additionally, hardware refers to any hardware capable of packet protocol encapsulation. For example, in one embodiment, the hardware may include media access control (MAC) hardware.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
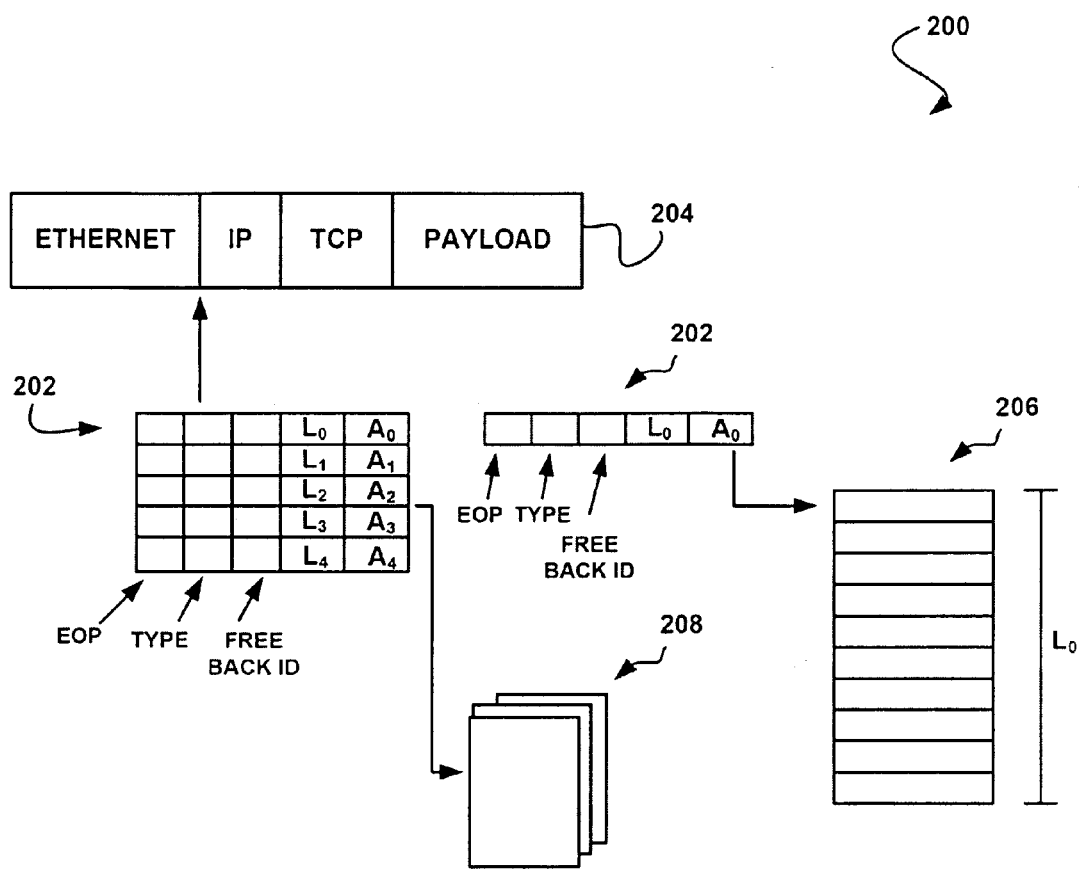
FIG. 2 shows a system for offloading packet protocol encapsulation from software, in accordance with one embodiment.

FIG. 2 shows a system 200 for offloading packet protocol encapsulation firm software, in accordance with one embodiment. As an option, the present system 200 may be implemented in the context of FIG. 1. Of course, however, the system 200 may be implemented in any desired environment. It should also be noted that the aforementioned definitions may apply during the present description.

As shown, pointer information 202 is used to assemble a packet 204 such that packet protocol encapsulation to encapsulate various headers is performed in the hardware. In this way, copy operations involving packet assembly in software may be avoided.

As an option, the pointer information 202 may include one or more pointers. The pointers may each include address information ($A_n$) which point to a physical base address of an array of packet descriptors. For example, the address may point to an array 206 of P2D (pointer-to-data) type packet descriptors.

Furthermore, the pointer information 202 may include a length ($L_n$) which indicates the length of the array 206. In this case, the length may indicate the number of descriptors in the array. Additionally, the pointer information 202 may further include end of packet information (EOP), such as an end of packet bit.

The pointer information 202 may also include information defining a pointer type. For example, the pointer information 202 may include a bit indicating whether the pointer type is a P2D type packet descriptor or a pointer-to-pointer (P2P) type packet descriptor. In addition, the pointer information may include a Free Back ID (FBID).

In this case, the Free Back ID may make it possible for a consumer of a packet to recycle the packet data buffers directly back to the originator. For example, if a packet id received by a network interface and subsequently forwarded to a CPU thread, which must then forward the packet to another network interface for transmission, the network interface controller may dispose of the exhausted packet buffer memory by returning it to the originating network interface controller upon consumption of the packet. Thus, by setting the FBID field in the descriptor, to the originating network interface controller destination ID, the consumed buffer may be automatically recycled to the original network interface by hardware.

In this way, the pointer information may include an identifier of a processor to which the pointer information is to be returned, after at least one of the packets is assembled. In this case, the processor may include a first processor that is different from a second processor from which the pointer information is received. As another option, the pointer information may include an instruction for returning the pointer information to an available pointer buffer, after at least one of the packets is assembled.

In operation, a packet including a payload, a TCP header, an IP header, and an Ethernet header may be received. It may be desirable to insert information such as VLAN tags, MPLS headers, IP headers, and/or security headers between the Ethernet and the IP header. In this case, the information may include an address and length associated with data in a buffer. Thus, a list of descriptors/pointers may be developed such that address and length information may be utilized to access associated data. In this case, the list of pointers may be included in a data structure including additional information.

Figure 3:
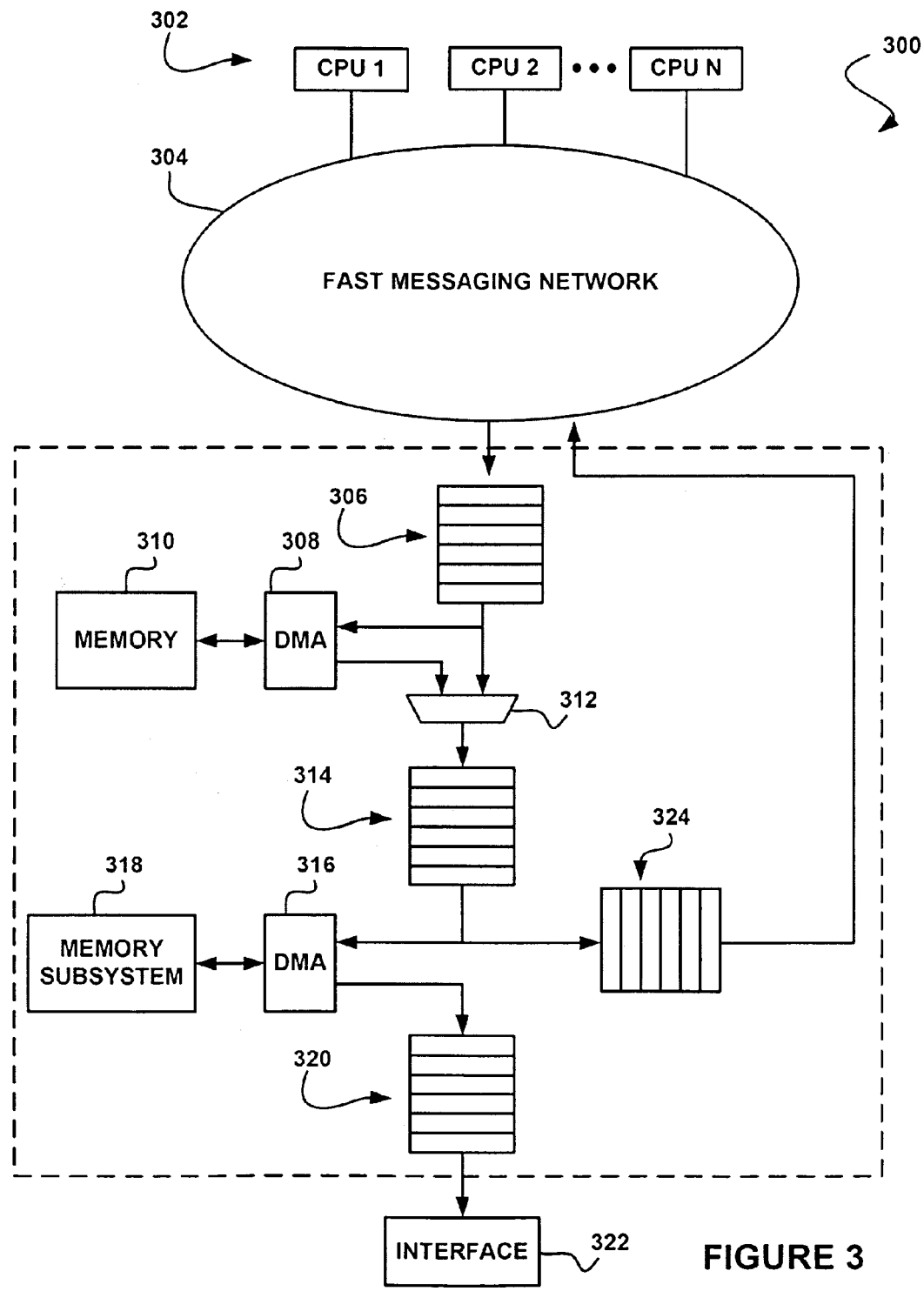
FIG. 3 shows a system egress path for offloading packet protocol encapsulation from software to hardware, in accordance with one embodiment.

FIG. 3 shows a system 300 egress path for offloading packet protocol encapsulation from software to hardware, in accordance with one embodiment. As an option, the present system 300 may be implemented in the context of the functionality and architecture of FIGS. 1-2. Of course, however, the system 300 may be implemented in any desired environment. Again, the aforementioned definitions may apply during the present description.

In operation, one or more central processing units 302 transmit a packet by creating a packet using pointer information and placing the pointer information on a fast messaging network (FMN) 304 in the form of a packet descriptor. The packet descriptor is placed into a FIFO 306. If the packet descriptor is a P2P descriptor, the packet descriptor is routed to a DMA (direct memory access) engine 308 such that information associated with the packet descriptor may be retrieved from memory 310, using pointers associated with the packet descriptor.

If the packet descriptor is not a P2P descriptor, the packet is routed through a multiplexer 312 into another FIFO 314. A DMA engine 316 is then used to fetch packet data from a memory subsystem 318. The packet data is written to a FIFO 320 and the packet data is sent out via the interface 322.

Upon transmission, the packet descriptor sent to the FIFO 314 is sent to at least one of the CPUs 302 via a FIFO 324 and the FMN 304. The receiving CPU may then use this information as a sign of transmit complete. In this way, pointer information may be stored temporarily in a FIFO 324 until packet transmission is complete. The FIFO 314 can be used in conjunction with the FIFO 324 to handle re-transmission of the assembled packets.

Figure 4:
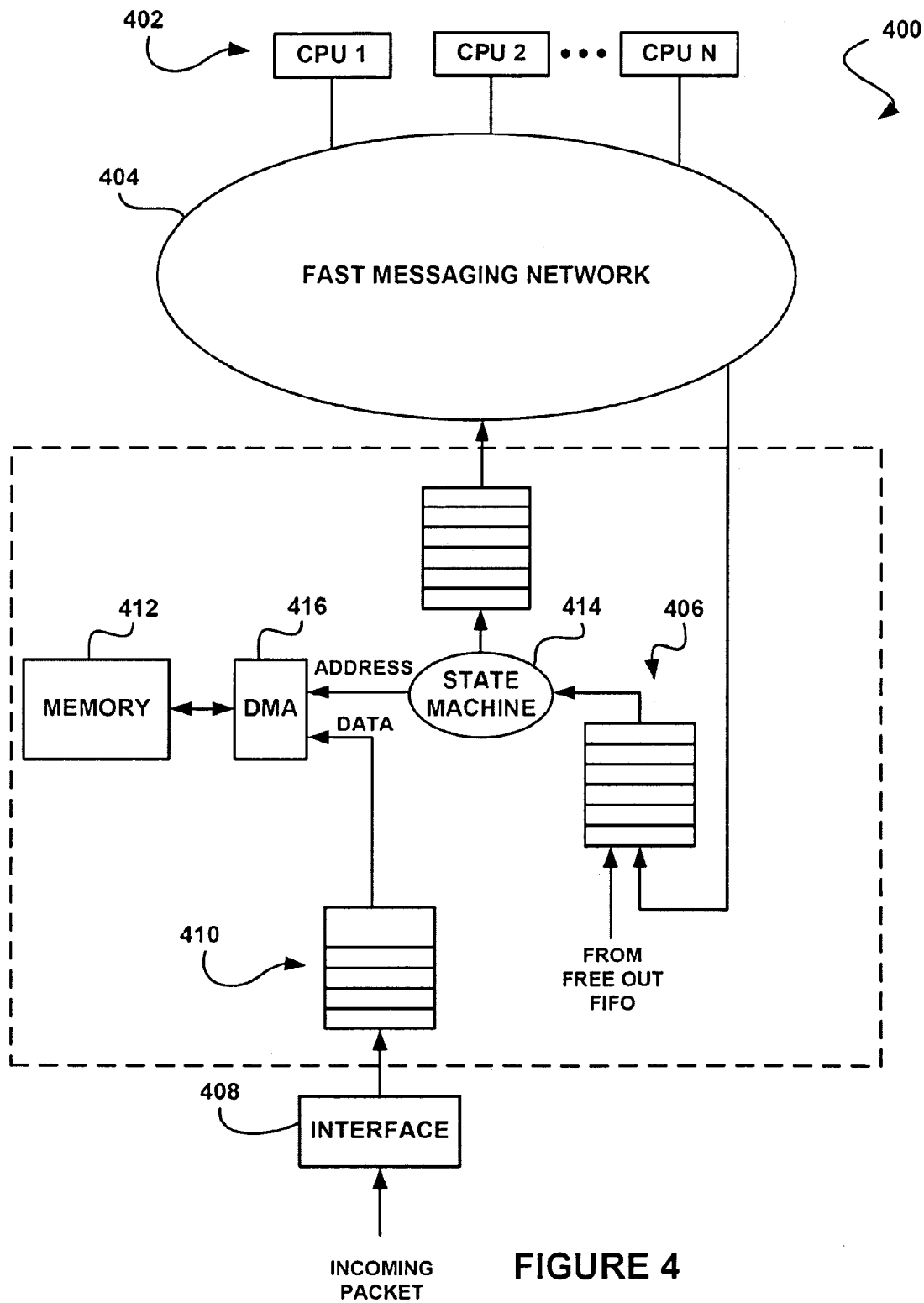
FIG. 4 shows a system ingress path using automatic memory management to recycle egress buffers for incoming ingress traffic, in accordance with one embodiment.

FIG. 4 shows a system 400 ingress path for offloading packet protocol encapsulation from software to hardware, in accordance with one embodiment. As an option, the present system 400 may be implemented in the context of the functionality and architecture of FIGS. 1-3. Of course, however, the system 400 may be implemented in any desired environment. Further, the aforementioned definitions may apply during the present description.

In operation, at least one of a plurality of CPUs 402 allocates memory and assigns pointer addresses to the memory. These pointers are sent through an ingress data path via a fast messaging network 404 to a Free-in FIFO 406. Additionally, a packet on a network is received via the interface 408, placed in a FIFO 410 and subsequently stored in memory 412 at an address read out from the Free-in-FIFO 406. A packet descriptor is then generated and sent to at least one of the CPUs 402 via the FMN 404. In this case, a state machine 414 and/or a DMA engine 416 may be utilized to parse packet header information and create a packet descriptor.

Figure 5:
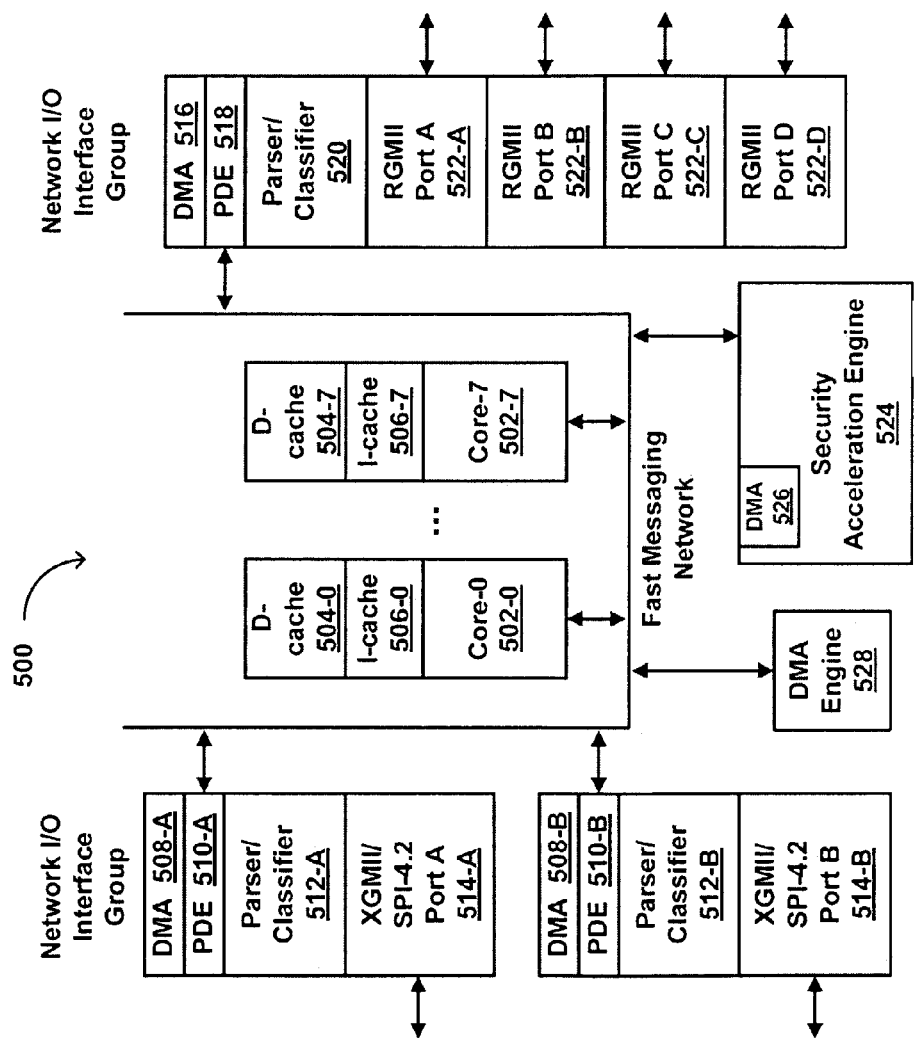
FIG. 5 shows a system illustrating various agents attached to a fast messaging network (FMN), in accordance with one embodiment.

FIG. 5 shows a system 500 illustrating various agents attached to a fast messaging network (FMN), in accordance with one embodiment. As an option, the present system 500 may be implemented in the context of the functionality and architecture of FIGS. 1-4. Of course, however, the system 500 may be implemented in any desired environment. Again, the aforementioned definitions may apply during the present description.

As shown, eight cores (Core-0 502-0 through Core-7 502-7) along with associated data caches (D-cache 504-0 through 504-7) and instruction caches (I-cache 506-0 through 506-7) may interface to an FMN. Further, Network I/O Interface Groups can also interface to the FMN. Associated with a Port A, a DMA 508-A, a Parser/Classifier 512-A, and an XGMII/SPI-4.2 Port A 514-A can interface to the FMN through a Packet Distribution Engine (PDE) 510-A. Similarly, for a Port B, a DMA 508-B, a Parser/Classifier 512-B, and an XGMII/SPI-4.2 Port B 514-B can interface to the FMN through a PDE 510-B. Also, a DMA 516, a Parser/Classifier 520, an RGMII Port A 522-A, an RGMII Port B 522-B, an RGMII Port C 522-C, and an RGMII Port D 522-D can interface to the FMN through a PDE 518. Also, a Security Acceleration Engine 524 including a DMA 526 and a DMA Engine 528 can interface to the FMN.

In one embodiment, all agents (e.g. cores/threads or networking interfaces, such as shown in FIG. 5) on the FMN can send a message to any other agent on the FMN. This structure can allow for fast packet movement among the agents, but software can alter the use of the messaging system for any other appropriate purpose by so defining the syntax and semantics of the message container. In any event, each agent on the FMN may include a transmit queue and a receive queue. Accordingly, messages intended for a particular agent can be dropped into the associated receive queue. All messages originating from a particular agent can be entered into the associated transmit queue and subsequently pushed on the FMN for delivery to the intended recipient.

In another aspect of embodiments of the invention, all threads of the core (e.g., Core-0 502-0 through Core-7 502-7) can share the queue resources. In order to ensure fairness in sending out messages, a "round-robin" scheme may be implemented for accepting messages into the transmit queue. This can guarantee that all threads have the ability to send out messages even when one of them is issuing messages at a faster rate. Accordingly, it is possible that a given transmit queue may be full at the time a message is issued. In such a case, all threads may be allowed to queue up one message each inside the core until the transmit queue has room to accept more messages. Further, the networking interfaces may use the PDE to distribute incoming packets to the designated threads. Further, outgoing packets for the networking interfaces may be routed through packet ordering software.

As an example of one implementation of the system 500, packets may be received by a network interface. The network interface may include any network interface. For example, in various embodiments, the network interface may include a Gigabit Media Independent Interface (GMII), a Reduced Gigabit Media Independent Interface (RGMII), or any other network interface.

When the network interface begins to receive a packet, the network interface stores the packet data in memory, and notifies software of the arrival of the packet, along with a notification of the location of the packet in memory. In this case, the storing and the notification may be performed automatically by the network interface, based on parameters set up by software.

In one embodiment, storing the packet may include allocating memory buffers to store the packet. For example, as packet data arrives, a DMA may consume preallocated memory buffers and store packet data in memory. As an option, the notification of the arrival of the packet may include deciding which thread of a plurality of CPUs should be notified of the arrival.

In one embodiment, the incoming packet data may be parsed and classified. Based on this classification, a recipient thread may be selected from a pool of candidate recipient threads that are designed to handle packets of this kind. A message may then be sent via the FMN to the designated thread announcing its arrival. By providing a flexible feedback mechanism from the recipient thread, the networking interfaces may achieve load balancing across a set of threads.

A single FMN message may contain a plurality of packet descriptors. Additional FMN messages may be generated as desired to represent long packets. In one embodiment, packet descriptors may contain address data, packet length, and port of origin data. One packet descriptor format may include a pointer to the packet data stored in memory. In another case, a packet descriptor format may include a pointer to an array of packet descriptors, allowing for packets of virtually unlimited size to be represented.

As an option, a bit field may indicate the last packet descriptor in a sequence. Using packet descriptors, network accelerators and threads may send and receive packets, create new packets, forward packets to other threads, or any device, such as a network interface for transmission. When a packet is finally consumed, such as at the transmittal networking interface, the exhausted packet buffer may be returned to the originating interface so it can be reused.

In one embodiment, facilities may exist to return freed packet descriptors back to their origin across the FMN without thread intervention. Although, FMN messages may be transmitted in packet descriptor format, the FMN may be implemented as a general purpose message-passing system that can be used by threads to communicate arbitrary information among them.

In another implementation, at system start-up, software may provide all network interfaces with lists of fixed-size pre-allocated memory called packet buffers to store incoming packet data. Pointers may then be encapsulated to the packet buffers in packet descriptors, and sent via the FMN to the various network interfaces.

Each interface may contain a Free-In Descriptor FIFO used to queue up these descriptors. Each of these FIFOs may correspond to a bucket on the FMN. At startup, initialization software may populate these FIFOs with free packet descriptors. In one embodiment, the Free-In Descriptor FIFO may hold a fixed number of packet descriptors on-chip (e.g. 128, 256, etc.) and be extended into memory using a "spill" mechanism.

For example, when a FIFO fills up, spill regions in memory may be utilized to store subsequent descriptors. These spill regions may be made large enough to hold all descriptors necessary for a specific interface. As an option, the spill regions holding the free packet descriptors may also be cached.

When a packet comes in through the receive side of the network interfaces, a free packet descriptor may be popped from the Free-In Descriptor FIFO. The memory address pointer in the descriptor may then be passed to a DMA engine which starts sending the packet data to a memory subsystem. As many additional packet descriptors may be popped from the Free-In Descriptor FIFO as are utilized to store the entire packet. In this case, the last packet descriptor may have an end-of-packet bit set.

In various embodiments, the packet descriptor may include different formats. For example, in one embodiment, a receive packet descriptor format may be used by the ingress side of network interfaces to pass pointers to packet buffers and other useful information to threads.

In another embodiment, a P2D type packet descriptor may be used by the egress side of network interfaces to access pointers to packet buffers to be transmitted. In this case, the P2D packet descriptors may contain the physical address location from which the transmitting DMA engine of the transmitting network interface will read packet data to be transmitted. As an option, the physical address may be byte-aligned or cache-line aligned. Additionally, a length field may be included within P2D Descriptors which describes the length of useful packet data in bytes.

In still another embodiment, a P2P type descriptor may be used by the egress side of network interfaces to access packet data of virtually unlimited size. The P2P type descriptors may allow FMN messages to convey a virtually unlimited number of P2D type descriptors. As an option, the physical address field specified in the P2P type descriptor may resolve to the address of a table of P2D type descriptors. In other embodiments, a free back descriptor may be used by the network interfaces to indicate completion of packet processing and a free in descriptor may be sent from threads during initialization to populate the various descriptor FIFOs with free packet descriptors.

In one embodiment, four P2D packet descriptors may be used to describe the packet data to be sent. For example, a descriptor "A1" may contain a byte-aligned address which specifies the physical memory location containing the packet data used for constructing the packet to be transmitted, a total of four of which comprise the entire packet. The byte-aligned length and byte-aligned address fields in each packet descriptor may be used to characterize the four components of the packet data to be transmitted. Furthermore, a descriptor "A4" may have an EOP bit set to signify that this is the last descriptor for this packet.

Since P2D packets can represent multiple components of a packet, packet data need not be contiguous. For example, a descriptor "A1" may address a buffer containing an Authentication Header (AH) and Encapsulating Security Protocol (ESP) readers, which may be the first chunk of data needed to build up the packet. Likewise, the second chunk of data required is likely the payload data, addressed by a descriptor "A2." The ESP authentication data and ESP trailer are the last chunk of data needed to build the packet, and so may be pointed to by a last descriptor "A3," which also has the EOP bit set signifying that this is the last chunk of data being used to form the packet. In a similar manner, other fields, such as VLAN tags, could be inserted into packets by using the byte-addressable pointers available in the P2D descriptors.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of transmitting a network packet, comprising:
creating a packet using pointer information, the pointer information including a packet descriptor associated with packet data stored in a packet buffer memory allocated by a central processing unit;
placing the pointer information on a fast messaging network in the form of the packet descriptor;
placing the packet descriptor in a first FIFO;
routing the packet descriptor to a direct memory access (DMA) engine using pointers associated with the packet descriptor, if the packet descriptor is a P2P descriptor;
routing the packet through a multiplexer into a second FIFO if said packet descriptor is not a P2P descriptor;
sending the packet from the second FIFO to a third FIFO;
transmitting the packet data via a network interface of an egress unit from said third FIFO; and
releasing the packet buffer memory after the transmission of the packet, wherein the packet buffer memory is released by the egress unit.

2. The method of claim 1, wherein said packet descriptor includes a Free Back ID (FBID) field, and said egress unit releases the packet buffer memory upon successful transmission of the network packet by setting said FBID field in the packet descriptor.

3. The method of claim 1, wherein the pointer information includes an identifier of a processor to which the pointer information is to be returned, after at least one of the packets is assembled.

4. The method of claim 3, wherein the processor includes a first processor that is different from a second processor from which the pointer information is received.

5. The method of claim 1, wherein the pointer information includes an instruction for returning the pointer information to an available pointer buffer, after at least one of the packets is assembled.

6. The method of claim 1, wherein the pointer information includes a list of pointers that is included in a data structure including additional information.

7. The method of claim 6, wherein the pointers include length information and address information.

8. The method of claim 7, wherein the address information is unaligned.

9. The method of claim 1, wherein the pointer information include a single pointer that points to a plurality of pointers.

10. The method of claim 1, wherein the pointer information is received from a fast messaging network.

11. The method of claim 1, and further comprising using the pointer information to look up additional pointer information from memory.

12. The method of claim 1, and further comprising using the pointer information to look up packet protocol encapsulation information from memory.

13. The method of claim 12, wherein the packet protocol encapsulation information from memory includes at least one of virtual local area network (VLAN) information, Internet protocol (IP) information, security information, and multi-protocol label switching (MPLS) information.

14. The method of claim 1, wherein the pointer information is stored in a buffer.

15. The method of claim 14, wherein at least one pointer is utilized in conjunction with the buffer to handle re-transmission of the assembled packets.

16. The method of claim 1, wherein the egress unit includes media access control (MAC) hardware.

17. The method of claim 1, wherein a copy operation involving an assembled packet by software is avoided.

18. The method of claim 1, wherein the pointer information includes a Free Back ID (FBID).

19. The method of claim 18, wherein the FBID allows a consumed buffer to be automatically recycled to an original network interface by the egress unit.

20. The method of claim 1, wherein said egress unit is configured for transmitting a packet using at least one of a TCP protocol, IP protocol or ethernet protocol.

21. A system, comprising:
one or more central processing units (CPUs), said CPUs configured to create a packet using pointer information including a packet descriptor associated with packet data stored in a packet buffer allocated by said one or more CPUs;
an egress unit comprising a network interface, said egress unit operably coupled to said CPUs, said egress unit configured to transmit the packet created by said one or more CPUs, and configured to release the packet buffer memory upon successful transmission of the packet;
a fast messaging network operably coupled to said one or more CPUs and to said egress unit, said one or more CPUs further configured to place the pointer information on the fast messaging network in the form of a packet descriptor, said fast messaging network configured to send data to any other agent on the fast messaging network; and
said egress unit further comprising:
a first FIFO for receiving a packet descriptor from said fast messaging network in the form of a packet descriptor;
a first FIFO for receiving the packet descriptor from said fast messaging network;
a direct memory access (DMA) engine to which the packet descriptor is routed from said first FIFO using pointers associated with the packet descriptor, if the packet descriptor is a P2P descriptor;
a multiplexer and a second FIFO to which a packet is routed through if said packet descriptor is not a P2P descriptor; and
a third FIFO for receiving a packet sent from said second FIFO and transferring the packet data to the network interface to be transmitted.

22. The system of claim 21, wherein the egress unit includes media access control (MAC) hardware.

23. The system of claim 21, wherein the packet descriptor includes a Free Back ID (FBID) field, and said egress unit releases the packet buffer memory upon successful transmission of the packet by setting said FBID field in the packet descriptor.

* * * * *